US011308841B2

(12) United States Patent
Sato et al.

(10) Patent No.: US 11,308,841 B2
(45) Date of Patent: Apr. 19, 2022

(54) DISPLAY CONTROL DEVICE, DISPLAY APPARATUS, NON-TRANSITORY RECORDING MEDIUM, AND METHOD FOR CONTROLLING DISPLAY CONTROL DEVICE

(71) Applicant: SHARP KABUSHIKI KAISHA, Sakai (JP)

(72) Inventors: Yuichi Sato, Sakai (JP); Yohichi Takazane, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 17/105,295

(22) Filed: Nov. 25, 2020

(65) Prior Publication Data

US 2021/0183290 A1 Jun. 17, 2021

(30) Foreign Application Priority Data

Dec. 13, 2019 (JP) ............................. JP2019-225920

(51) Int. Cl.

| | |
|---|---|
| ***G09G 5/10*** | (2006.01) |
| ***H04N 5/235*** | (2006.01) |
| ***G09G 3/20*** | (2006.01) |

(52) U.S. Cl.

CPC ........... *G09G 3/20* (2013.01); *G09G 2340/16* (2013.01); *G09G 2370/08* (2013.01)

(58) Field of Classification Search

CPC .. G09G 3/20; G09G 3/34; G09G 3/36; G09G 5/00; G09G 5/02; G09G 5/10; G09G 5/12; G09G 5/14; G09G 5/18; G09G 5/36; G09G 2340/16; G09G 2370/08; G02F 1/133; G02F 1/1337; H04N 5/232; H04N 5/91; H04N 5/44; H04N 19/132; H04N 19/172; H04N 19/139; H04N 19/463; H04N 19/587

See application file for complete search history.

(56) References Cited

U.S. PATENT DOCUMENTS

| | | | | |
|---|---|---|---|---|
| 2014/0225877 A1* | 8/2014 | Nakanishi | G09G 3/3677 345/204 |
| 2015/0062100 A1* | 3/2015 | Tanaka | G09G 3/2096 345/204 |
| 2020/0005723 A1* | 1/2020 | Kim | G09G 3/3688 |
| 2021/0118386 A1* | 4/2021 | No | G09G 3/3648 |

FOREIGN PATENT DOCUMENTS

WO 2019/187062 A1 10/2019

* cited by examiner

*Primary Examiner* — Chanh D Nguyen
*Assistant Examiner* — Nguyen H Truong
(74) *Attorney, Agent, or Firm* — ScienBiziP, P.C.

(57) ABSTRACT

A host control unit is configured to set a transition interval between a first period for which an image is displayed at a first frame rate and a second period for which the image is displayed at a second frame rate different from the first frame rate, the transition interval being a period in which a frame rate is changed between the first frame rate and the second frame rate, and cause a display control unit to reduce a luminance difference of the image data in the transition interval, the luminance difference being caused when the frame rate is changed between the first frame rate and the second frame rate.

8 Claims, 7 Drawing Sheets

DISPLAY CONTROL DEVICE, DISPLAY APPARATUS, NON-TRANSITORY RECORDING MEDIUM, AND METHOD FOR CONTROLLING DISPLAY CONTROL DEVICE

BACKGROUND

1. Field

An aspect of the present disclosure relates to a display control device, a display apparatus including the display control device, a non-transitory recording medium, and a method for controlling the display control device.

2. Description of the Related Art

As electro-optical elements for constituting pixels arranged in a matrix, current-driven organic electroluminescent (EL) elements are widely known. In recent years, organic EL elements have attracted attention because they can implement large and slim displays with incorporated display apparatuses and also can display vivid images, and as a result, organic EL displays including organic EL elements as pixels have been increasingly developed.

In particular, the development has mostly been focusing on active matrix display apparatuses in which a current-driven electro-optical element is provided for each pixel together with a switch element such as a thin-film transistor (TFT) configured to be individually controlled such that the current-driven electro-optical elements can be controlled with respect to the individual pixels. This is because active matrix display apparatuses can display higher-resolution images as compared to passive matrix display apparatuses.

An active matrix display apparatus has connection lines formed for individual rows in the horizontal direction, and data lines formed for individual columns in the vertical direction, and a power line. Each pixel has an electro-optical element, a connection transistor, a drive transistor, and a capacitor. The connection transistor is turned on by a voltage being applying to the connection line and the capacitor is accordingly charged with a data voltage (data signal) on the data line, so that data can be written into the capacitor. The data voltage by which the capacitor is charged then turns on the drive transistor to force current to flow into the electro-optical element from the power line and as a result, the electro-optical element emits light for the corresponding pixel.

Furthermore, when the active matrix display apparatus forms an image by using pixels arranged on the display apparatus and configured to emit light in accordance with data signals, the active matrix display apparatus can display moving images or the like by, for example, producing one frame constituting the moving images by one scan of the connection lines in the vertical direction at a particular frequency.

The particular frequency is set at a relatively high frequency when a user uses a portable terminal or the like with an incorporated display apparatus in a normal operation state to, for example, view image information on the display apparatus by controlling the portable terminal or the like. By contrast, for example, in the case of a standby state in which the user is unwilling to obtain image information by using the display apparatus, the particular frequency may be set at a relatively low frequency. However, there is a problem that, when an active matrix display apparatus using electro-optical elements such as organic EL elements operates at a low frequency, flicker may occur.

The specification of International Publication No. 2019/187062 discloses a display apparatus that can suppress the occurrence of flicker by reducing the supply voltage difference between the drive power supply and the cathode power supply when the display apparatus operates at low frequencies in comparison to the case of high frequencies.

However, the known technology described above has a problem that, when the frame rate is changed, luminance suddenly changes because the light intensity per unit time (integrated value) changes, and as a result, luminance flicker occurs, which results in the degradation of display quality of the display apparatus.

SUMMARY

An aspect of the present disclosure has been made in consideration of the problem described above. It is desirable to implement a low power consumption display apparatus without display quality degradation by reducing a change in luminance when the frame rate is changed.

To address the problem described above, a display control device according to an aspect of the present disclosure is used to control a display apparatus including a display panel. The display control device includes a host control unit configured to obtain or generate image data of an image to be displayed on the display panel and a display control unit configured to output to the display panel the image data transferred from the host control unit. The host control unit is configured to set a transition interval between a first period for which the image is displayed at a first frame rate and a second period for which the image is displayed at a second frame rate different from the first frame rate, the transition interval being a period in which a frame rate is changed between the first frame rate and the second frame rate. The host control unit is also configured to cause the display control unit to reduce a luminance difference of the image data in the transition interval, the luminance difference being caused when the frame rate is changed between the first frame rate and the second frame rate.

To address the problem described above, a method according to an aspect of the present disclosure is used to control a display control device configured to control a display apparatus including a display panel, the display control device including a host control unit configured to obtain or generate image data of an image to be displayed on the display panel and a display control unit configured to output to the display panel the image data transferred from the host control unit. The method includes causing the host control unit to act a transition interval between a first period for which the image is displayed at a first frame rate and a second period for which the image is displayed at a second frame rate different from the first frame rate, the transition interval being a period in which a frame rate is changed between the first frame rate and the second frame rate. The method further includes causing the display control unit to reduce a luminance difference of the image data in the transition interval, the luminance difference being caused when the frame rate is changed between the first frame rate and the second frame rate.

DESCRIPTION OF THE EMBODIMENTS

Outline Configuration of Display Apparatus

Figure 1:
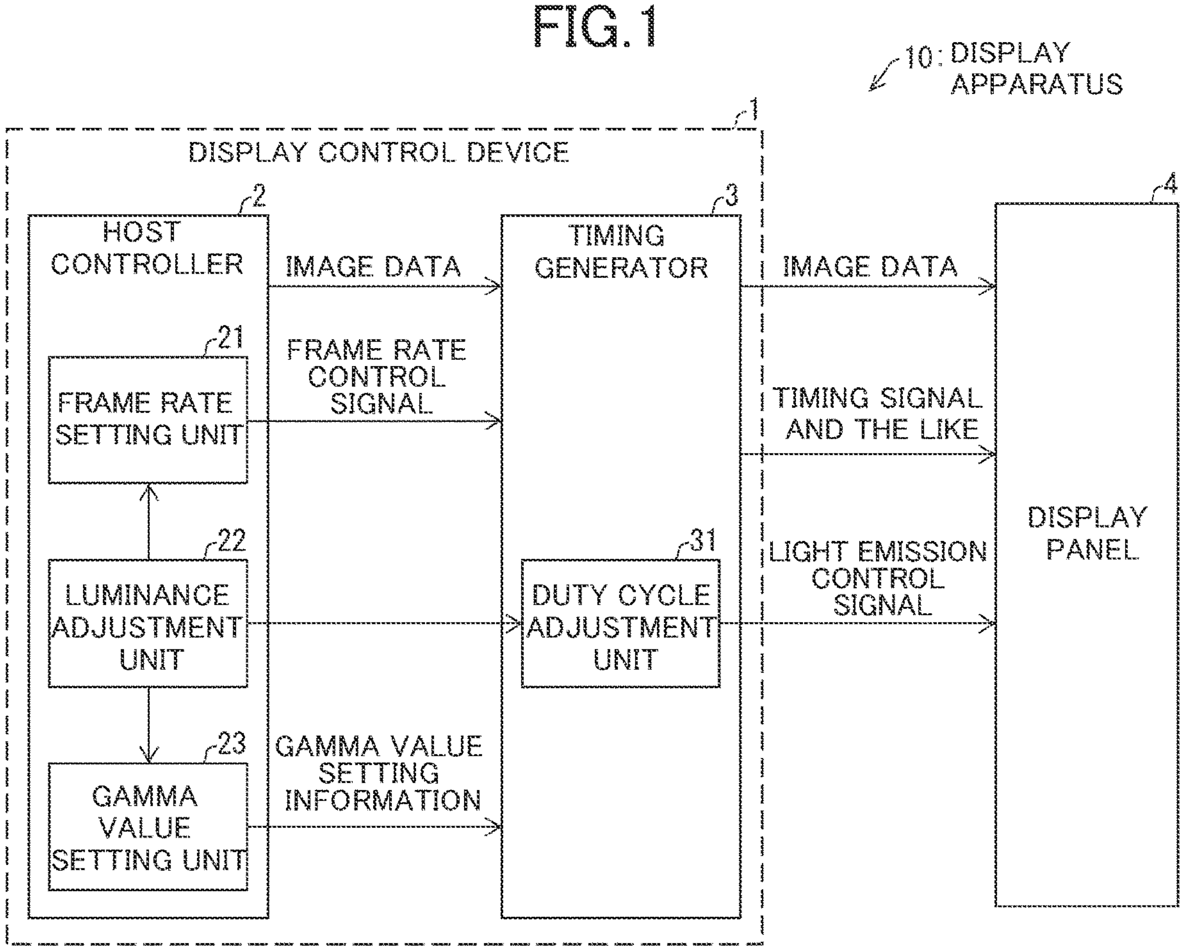
FIG. 1 is a block diagram illustrating an outline configuration of a display apparatus according to an embodiment of the present disclosure.

Firstly, an outline configuration of a display apparatus 10 according to an embodiment of the present disclosure is described with reference to FIG. 1. As illustrated in FIG. 1, the display apparatus 10 includes at least a display control device 1 and a display panel 4. The display control device 1 is illustrated in a region enclosed by a dashed line in the drawing. Preferred examples of the display apparatus 10 include various electronic devices having a display screen, such as a mobile phone, a smartphone, a notebook personal computer, a tablet terminal, an e-book reader, and a personal digital assistant (PDA).

Configuration of Display Control Device 1

The display control device 1 controls the display apparatus 10 including the display panel 4. The display control device 1 includes a host controller 2 (host control unit) and a timing generator 3 (display control unit). The host controller 2 includes a frame rate setting unit 21, a luminance adjustment unit 22, and a gamma value setting unit 23. The timing generator 3 includes a duty cycle adjustment unit 31. The host controller 2 is a control circuit formed at a circuit board. At least a part of the host controller 2 can be implemented by using, for example, a central processing unit (CPU) and a memory. The host controller 2 mainly performs host-side control of the display control device 1 (for example, control for the portable terminal).

Configuration of Host Controller 2

The host controller 2 obtains or generates image data to be represented on the display panel 4 and transfers the image data to the timing generator 3.

The host controller 2 also sends, together with or separately from the image data, a presentation update request to the timing generator 3. The presentation update request is an instruction for representing the image data on the display panel 4. The host controller 2 transfers the image data to the timing generator 3 at a particular frequency (Hz), that is, a particular frame rate. The format of imago data is not particularly limited when the display panel 4 can display the image data.

The frame rate setting unit 21 outputs to the timing generator 3 a frame rate control signal to set the frame rate of image data. In response to the received frame rate control signal, the timing generator 3 sets at a particular value the frame rate of image data to be outputted to the display panel 4.

The luminance adjustment unit 22 causes the timing generator 3 to reduce a luminance difference of the image data caused when the frame rate is changed between a first frame rate and a second frame rate in a preset transition interval. The transition interval is a period that is set between a first period for which images are displayed at the first frame rate and a second period for which images are displayed at the second frame rate. The first frame rate and the second frame rate are different from each other. For example, in the case in which the first frame rate is set at 90 Hz, the second frame rate can be set at 60 Hz. While in this case the first frame rate is higher than the second frame rate, the frame rates may be set to satisfy the relationship in which the first frame rate is lower than the second frame rate.

In addition, the luminance adjustment unit 22 causes the frame rate setting unit 21 to output a frame rate control signal to set the level of a third frame rate in the transition interval at a level between the first frame rate and the second frame rate.

The luminance adjustment unit 22 causes the duty cycle adjustment unit 31 to set a third duty cycle in the transition interval at a ratio different from a first duty cycle in the first period and a second duty cycle in the second period. The duty cycle is a ratio of a pixel light emission time of the display panel 4 to a display time of the image.

The luminance adjustment unit 22 also causes the gamma value setting unit 23 to output gamma value setting information to set a third gamma value in the transition interval at a value different from a first gamma value in the first period and a second gamma value in the second period. The gamma value is an index of brightness of image data.

Timing Generator 3

The timing generator 3 drives the display panel 4 in accordance with instructions provided by the host controller 2. Specifically, the timing generator 3 outputs image data to the display panel 4 at a particular frame rate in accordance with a frame rate control signal received from the frame rate setting unit 21. The timing generator 3 also sets the gamma value of image data to be outputted to the display panel 4 in accordance with gamma value sorting information received from the gamma value setting unit 23. The timing generator 3 also sets, by using the duty cycle adjustment unit 31, the duty cycle of image data to be outputted to the display panel 4 in accordance with an instruction provided by the luminance adjustment unit 22.

The timing generator 3 also generates a timing signal for driving the display panel 4 and a data signal (source signal data for presenting images) and outputs the timing signal and the data signal to the display panel 4.

Display Panel 4

The display panel 4 includes, for example, a display screen having multiple pixels, a source driver, and a gate driver. For example, an active-matrix oxide-semiconductor display panel can be used as the display panel 4. The oxide semiconductor display panel is formed by using oxide semiconductor TFTs as switching elements that are each provided to correspond to at least one or the pixels twodimensionally arranged. The oxide semiconductor TFT is constructed by using an oxide semiconductor for a semiconductor layer. Examples of the oxide semiconductor include an InGaZnO semiconductor, which is an oxide semiconductor formed by using an indium oxide, a gallium oxide, and a zinc oxide.

When the oxide semiconductor TFT is used, a relatively large amount of current flows in an on-state while a relatively small amount of current leaks out in an off-state. Additionally, the oxide semiconductor TFT has a good switch-off characteristic in which, when a switch is off, the amount of charge leakage is relatively small, and consequently, the oxide semiconductor TFT has an excellent charge retention characteristic. As a result of the employment of the oxide semiconductor TFT as a switching element, the refresh rate for images displayed on the display screen can be decreased to nearly 1 Hz. The decrease in the refresh rate results in energy savings.

In this description, the pixel display element is an organic EL display element, but it is also possible to employ other display elements than the organic EL display element. For example, in the case in which the display panel 4 is a liquid crystal display panel, the display apparatus 10 has a backlight, which is not illustrated in the drawings, at the back of the display panel 4.

In this configuration, the luminance adjustment unit 22 adjusts the luminance of image data in the transition interval. Thus, it is possible to reduce a change in luminance between before and after the change of frame rate.

Operation of Display Apparatus

Figure 2:
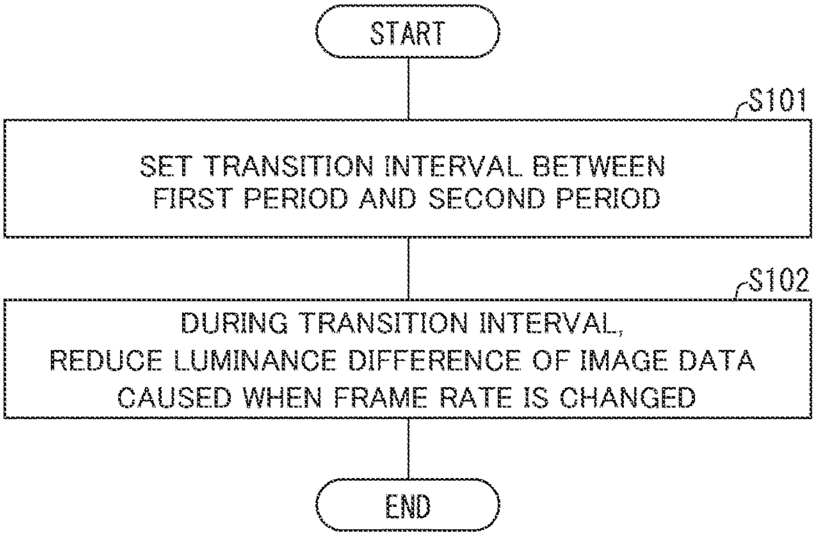
FIG. 2 is a flowchart illustrating an operational flow of the display apparatus.

Next, an operational flow of the display apparatus 10 is described with reference to a flowchart in FIG. 2. Firstly, in Step S101 (hereinafter "Step" will be not repeated), the host controller 2 sets a transition interval between the first period and the second period and the process moves to S102 (interval setting step).

Next, in S102, during the transition interval, the timing generator 3 reduces a luminance difference of image data caused when the frame rate is changed (luminance adjustment step). The methods indicated in Embodiments 1 to 5 which will be described later are examples of a method for reducing a luminance difference of image data in the luminance adjustment step.

Embodiment 1

Figure 3:
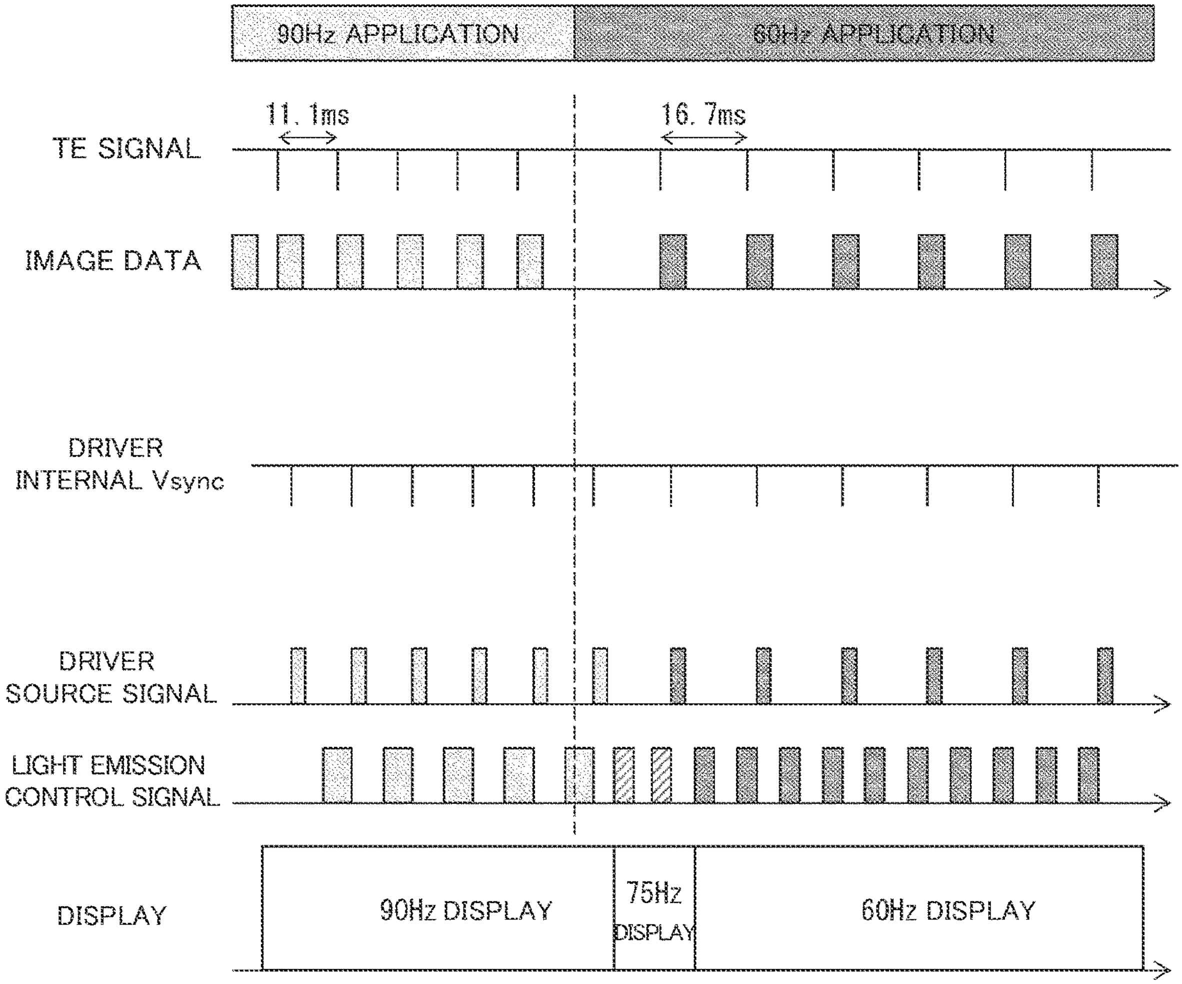
FIG. 3 is a timing chart illustrating an operational flow of a display apparatus according to Embodiment 1 of the present disclosure.

Next, an operational flow of the display apparatus 10 according to Embodiment 1 of the present disclosure is described with reference to FIG. 3. In the example illustrated in the drawing, the luminance adjustment unit 22 causes the frame rate setting unit 21 to output a frame rate control signal to set the third frame rate in the transition interval at a level between the first frame rate and the second frame rate as described above. In the example illustrated in the drawing, the first frame rate is set at 90 Hz, the second frame rate is set at 60 Hz, and the third frame rate is set at 75 Hz.

In this example, the frame rate is changed in stages to avoid sudden changes of duty cycle. For example, the frame rate is changed in stages starting with 90 Hz and proceeding to 75 Hz and consequently to 60 Hz. This configuration reduces the difference in light intensity per unit time when the frame rate is changed, suppresses sudden change in luminance, and consequently hinders the occurrence of luminance flicker.

Although in the present embodiment, the first frame rate>the third frame rate>the second frame rate is satisfied, the relationship among these frame rates is not limited to this example. For example, the frame rates may be set to establish a relationship in which the first frame rate<the third frame rate<the second frame rate. Furthermore, while in the present embodiment the frame rate is changed once in the middle while the first frame rate is changed to the second frame rate, this example should not be construed in a limiting sense and the frame rate may be changed multiple times. Moreover, the plurality of frame rates may decrease in stages when the first frame rate>the third frame rate>the second frame rate is satisfied or may increase in stages when the first frame rate<the third frame rate<the second frame rate is satisfied. With this configuration, since the third frame rate (or a plurality of frame rates) is set for the transition interval, it is possible to reduce a change in luminance when the frame rate is changed, in comparison to the case in which the transition interval is unset.

Embodiment 2

Figure 4:
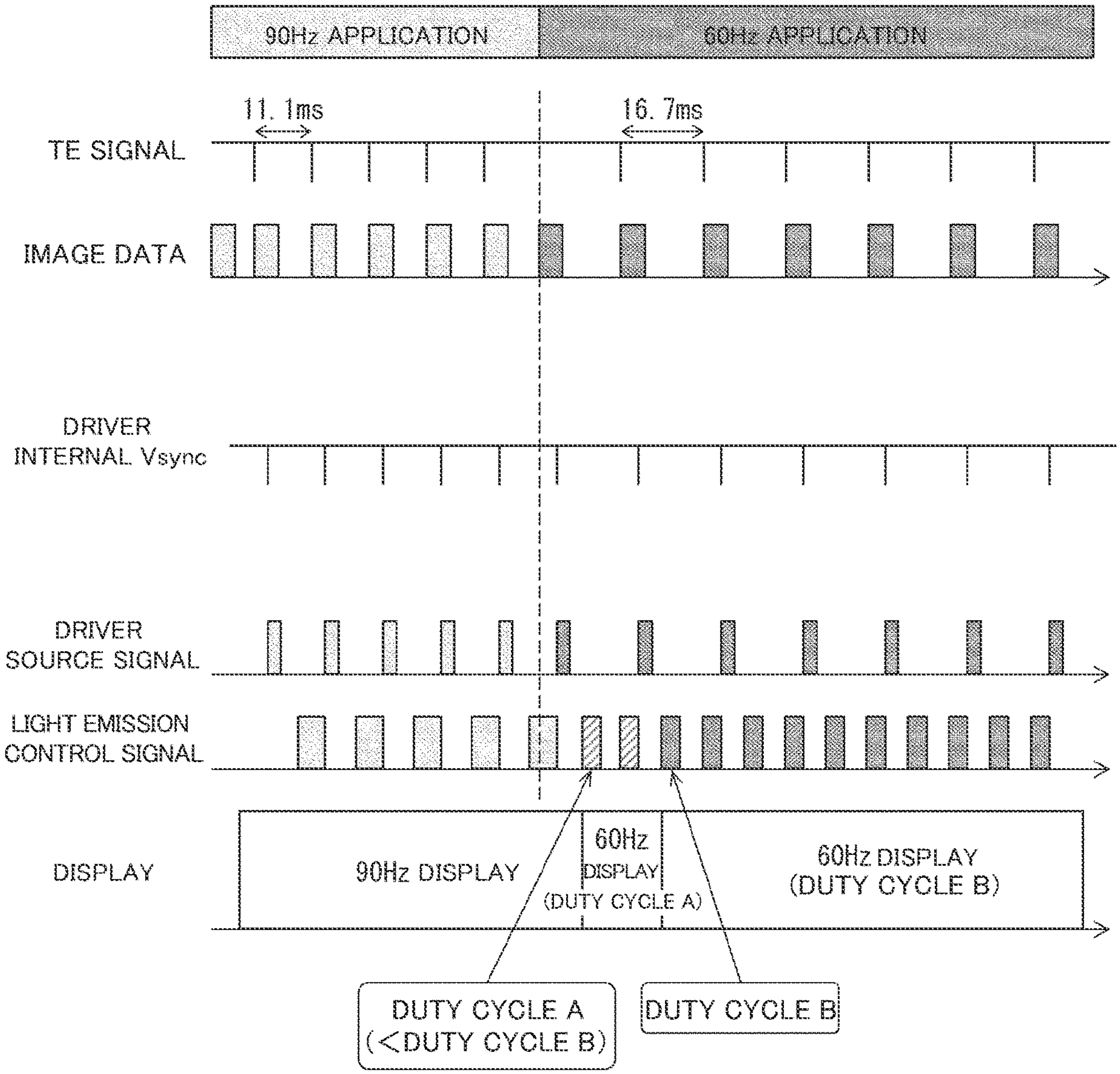
FIG. 4 is a timing chart illustrating an operational flow of a display apparatus according to Embodiment 2 of the present disclosure.

Next, an operational flow of the display apparatus 10 according to Embodiment 2 of the present disclosure is described with reference to FIG. 4. In the example illustrated in the drawing, the luminance adjustment unit 22 causes the duty cycle adjustment unit 31 to set the third duty cycle in the transition interval at a ratio different from the first duty cycle in the first period and the second duty cycle in the second period as described above.

In the example illustrated in the drawing, the duty cycle during 60 Hz display is changed in two stages of duty cycles A and B. Here, the duty cycle A<the duty cycle B is satisfied. Conversely, the duty cycle may be changed to establish a relationship in which the duty cycle A>the duty cycle B. In the present embodiment, the duty cycle is changed in stages to avoid sudden changes of duty cycle. For example, the duty cycle is changed in stages starting with 50% (90 Hz) and proceeding to 40% (60 Hz) and consequently to 50% (60 Hz). With this configuration, since the third duty cycle is set for the transition interval, it is possible to reduce a change in luminance when the frame rate is changed, in comparison to the case in which the transition interval is unset.

Embodiment 3

Figure 5:
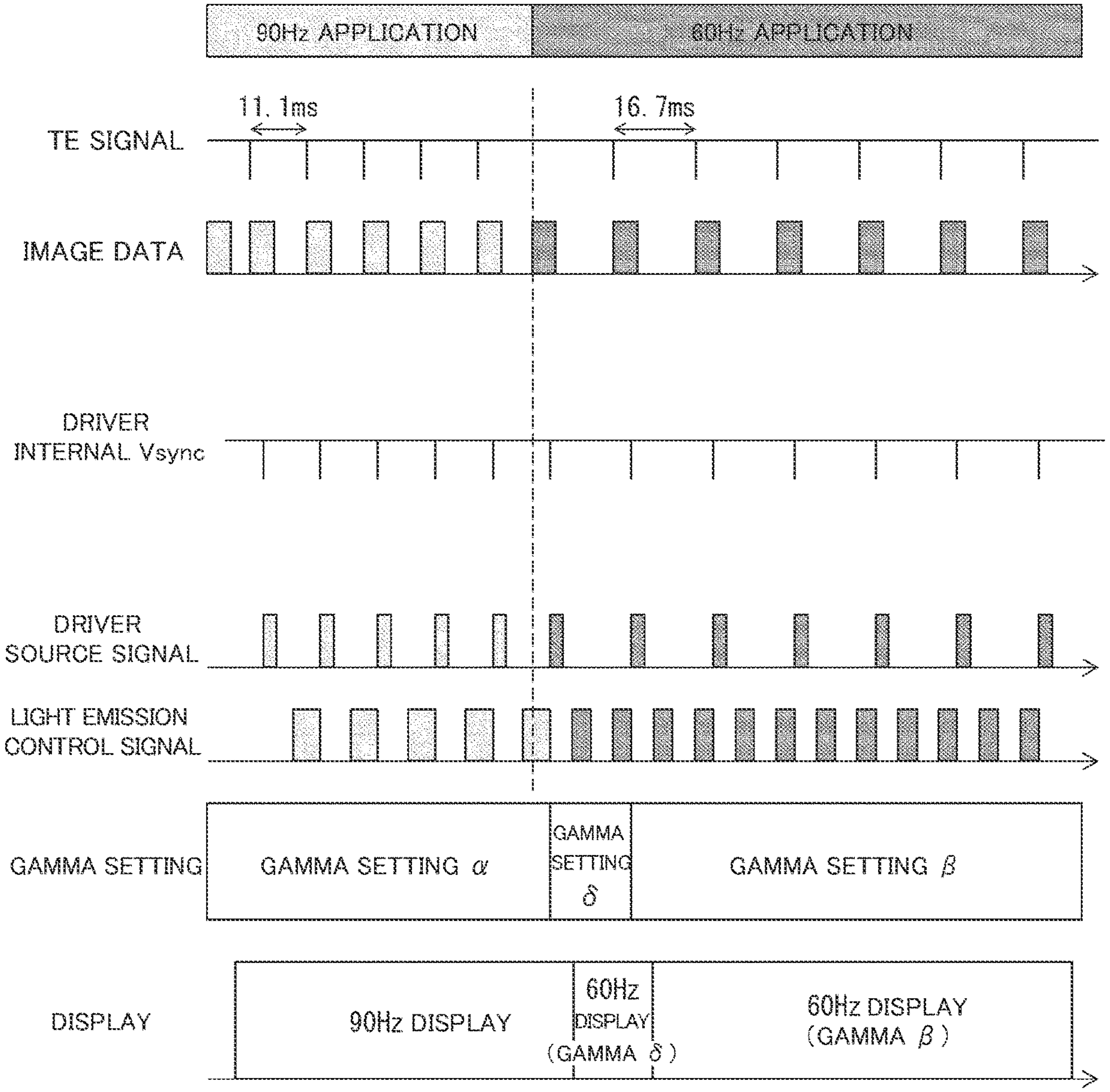
FIG. 5 is a timing chart illustrating an operational flow of a display apparatus according to Embodiment 3 of the present disclosure.

Next, an operational flow of the display apparatus 10 according to Embodiment 3 of the present disclosure is described with reference to FIG. 5. In the example illustrated in the drawing, the luminance adjustment unit 22 also causes the gamma value setting unit 23 to output gamma value setting information to set the third gamma value in the transition interval at a value different from the first gamma value in the first period and the second gamma value in the second period as described above.

In the example illustrated in the drawing, the gamma value is changed from $\alpha$ to $\delta$ to $\beta$. While in the present embodiment the gamma value is changed to establish a relationship in which $\alpha<\delta<\beta$, the gamma value may be conversely changed to establish a relationship in which $\alpha<\delta>\beta$.

In the present embodiment, to suppress changes in luminance due to the changes of duty cycle, source voltage setting (gamma setting) provided by the timing generator 3 is changed to reduce a luminance difference. With this configuration, since the third gamma value is set for the transition interval, it is possible to reduce a change in luminance when the frame rate is changed, in comparison to the case in which the transition interval is unset.

Embodiment 4

Figure 6:
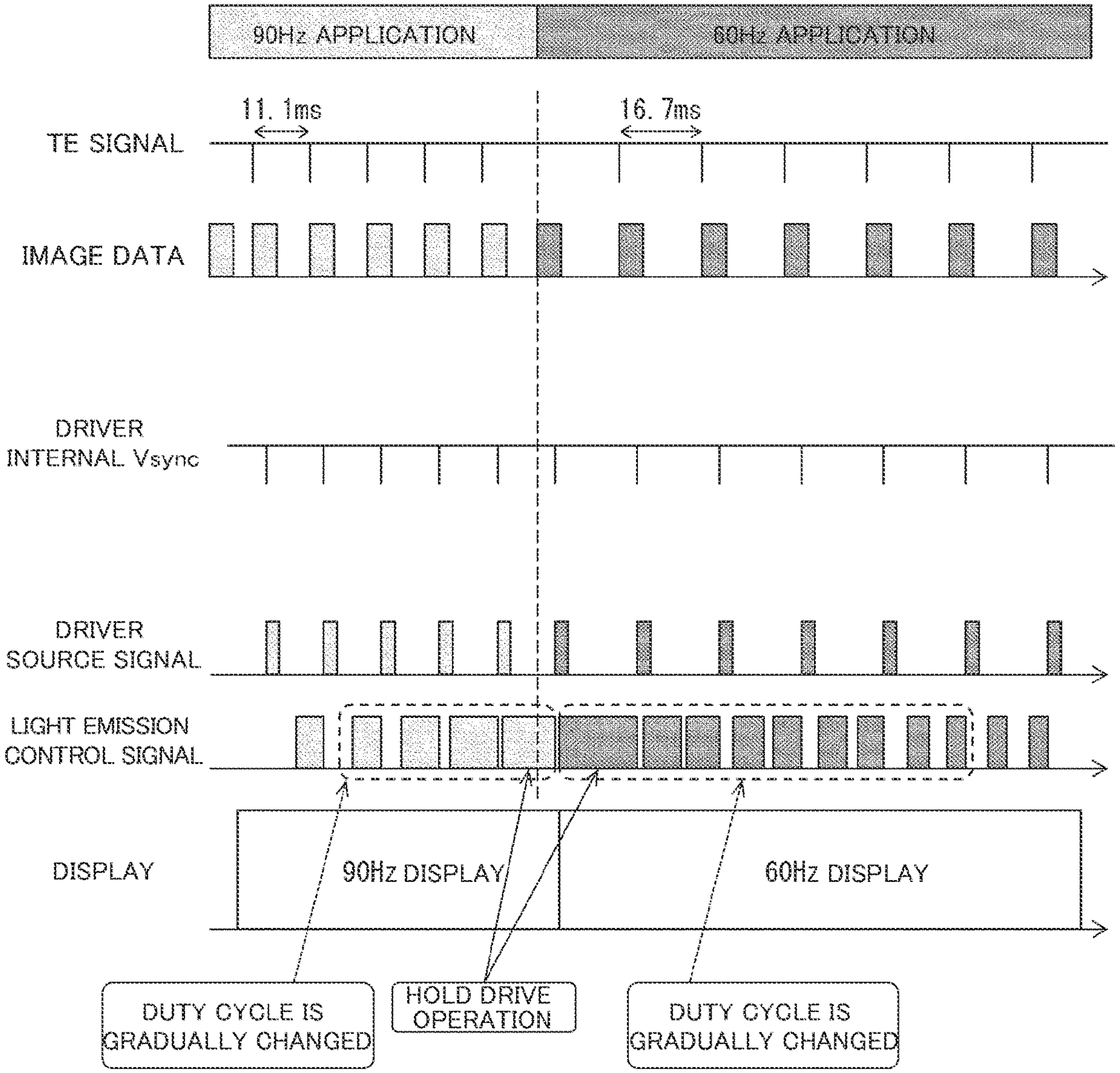
FIG. 6 is a timing chart illustrating an operational flow of a display apparatus according to Embodiment 4 of the present disclosure.

Next, an operational flow of the display apparatus 10 according to Embodiment 4 of the present disclosure is described with reference to FIG. 6. In the example illustrated in the drawing, in the first period, the duty cycle is gradually increased and then a hold drive operation (duty cycle=100%) is performed. In the second period, the duty cycle is gradually decreased from the ratio (duty cycle=100%) when the hold drive operation is performed. In the present embodiment, the duty cycle is 100% (hold drive operation) only when the frequency is changed but the duty cycle is gradually changed before and after the frequency is changed, and as a result, a luminance difference is reduced. With this configuration, it is possible to reduce a change in luminance between before and after the change of frame rate.

Embodiment 5

Figure 7:
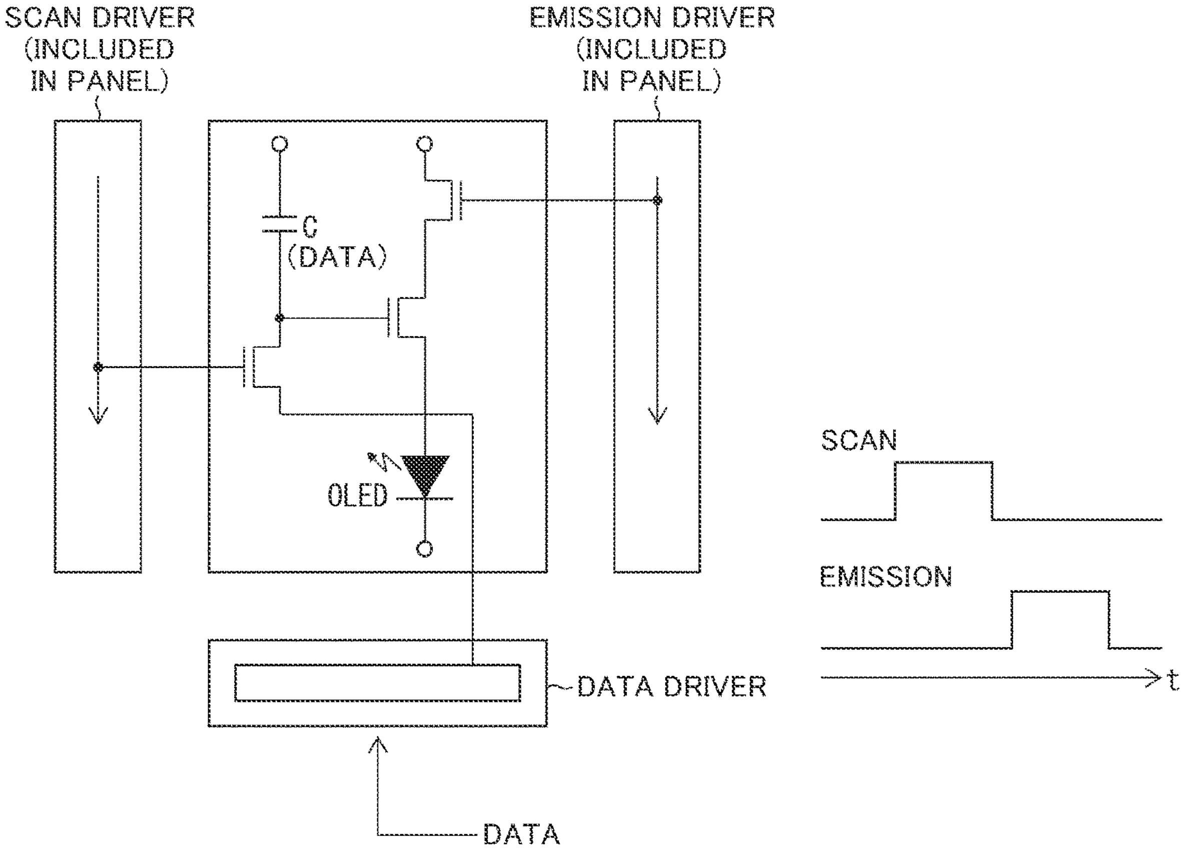
FIG. 7 provides a circuit diagram illustrating an outline circuit configuration of a display panel included in the display apparatus.

Next, FIG. 7 provides a circuit diagram of the display panel 4. The display panel 4 illustrated in the drawing has an advantage in which, when the oxide semiconductor described above is used for a circuit for charging and discharging a capacitor in a pixel circuit, it is possible to hold the display state at, for example, a refresh frequency lower than 30 Hz.

Figure 8:
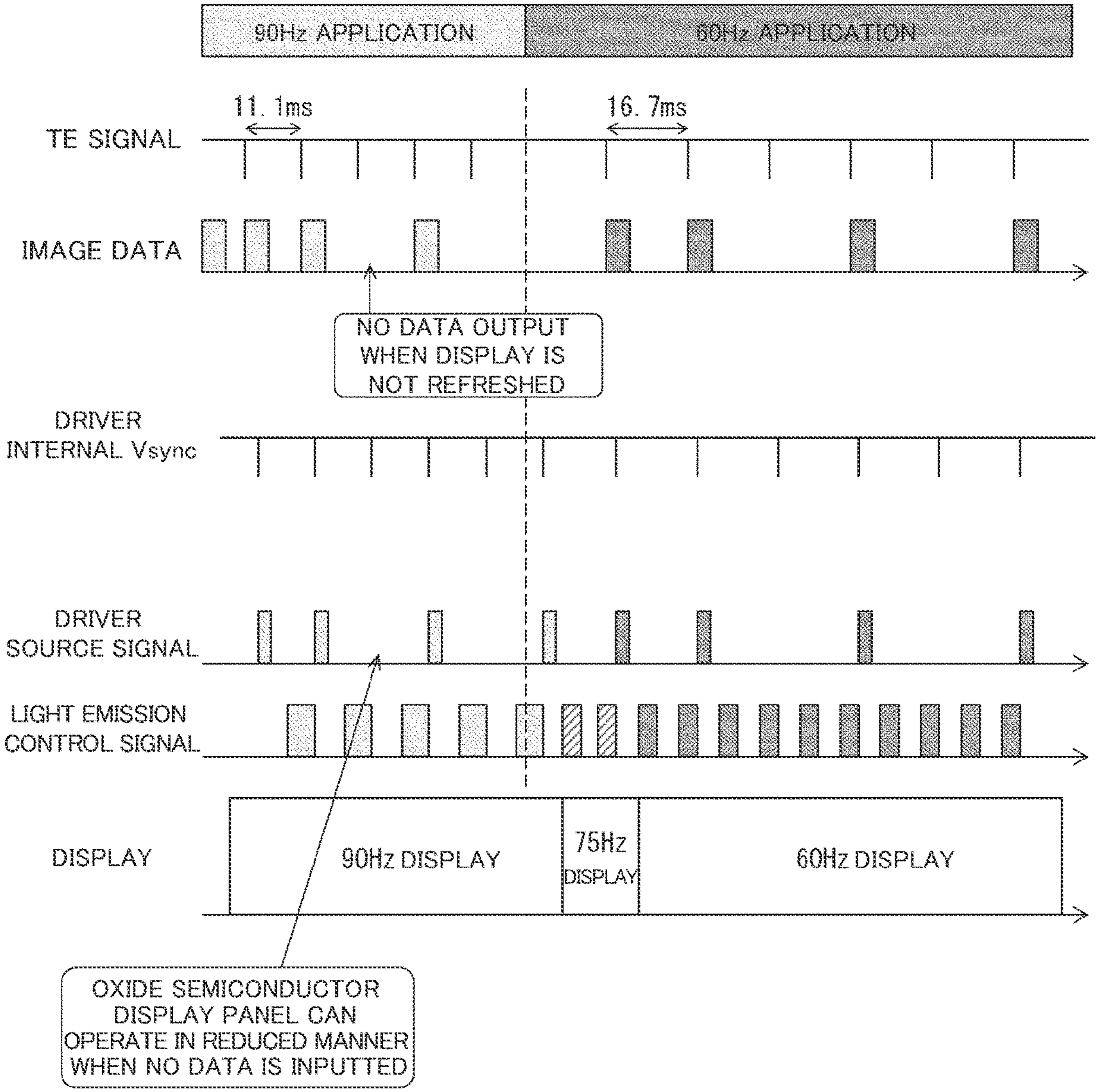
FIG. 8 is a timing chart illustrating an operational flow of a display apparatus according to Embodiment 5 of the present disclosure.

FIG. 8 is a timing chart illustrating an operational flow of the display apparatus 10 according to Embodiment 5 of the present disclosure. The display apparatus 10 according to the present embodiment differs from the display apparatus 10 according to Embodiment 1 in that the display panel 4, which is an oxide semiconductor display panel, can operate in a reduced manner when no image data is inputted as illustrated in the timing chart.

Implementation Example Using Software

The control block (particularly the host controller 2 and the timing generator 3) of the display control device 1 may be implemented as a logic circuit (hardware) formed at, for example, an integrated circuit (IC chip) or may be implemented as software.

In the latter case, the display control device 1 includes a computer for executing instructions of a program as software for implementing the functions. This computer includes, for example, at least one processor (controller) and at least one computer-readable recording medium storing the program described above. By using the computer, an aspect of the present disclosure can be implemented by the processor reading the program from the recording medium and running the program. For example, a CPU can be used as the processor. As the recording medium, a "non-transitory tangible medium" such as a read-only memory (ROM), a tape, a disk, a card, a semiconductor memory, or a programmable logic circuit can be used. Additionally, the computer may further include, for example, a random-access memory (RAM) into which the program is loaded. Moreover, the program may be provided for the computer by using any transmission medium (a communication network, airwaves, or the like) capable of transmitting the program. It should be noted that an aspect of the present disclosure can be implemented as data signals embedded in a carrier wave and representing the program in the form of electronic transmission.

CONCLUSION

The display control device (1) according to Aspect 1 of the present disclosure is used to control the display apparatus (10) including the display panel (4). The display control device (1) includes the host control unit (host controller 2) configured to obtain or generate image data of an image to be displayed on the display panel and the display control unit (timing generator 3) configured to output to the display panel the image data transferred from the host control unit. The host control unit is configured to set a transition interval between a first period for which the image is displayed at a first frame rate and a second period for which the image is displayed at a second frame rate different from the first frame rate, the transition interval being a period in which a frame rate is changed between the first frame rate and the second frame rate. The host control unit is also configured to cause the display control unit to reduce a luminance difference of the image data in the transition interval, the luminance difference being caused when the frame rate is changed between the first frame rate and the second frame rate.

This configuration reduces, in the transition interval, a luminance difference of image data caused when the frame rate is changed between the first frame rate and the second frame rate. As a result, it is possible to reduce a change in luminance when the frame rate is changed, in comparison to the case in which the transition interval is unset. Consequently, in comparison to the related art, it is possible to reduce luminance flicker caused when the frame rate is changed and also implement a low power consumption display apparatus without display quality degradation.

As for the display control device (1) according to Aspect 2 of the present disclosure, with respect to Aspect 1, when the duty cycle is a ratio of a pixel light emission time of the display panel to a display time of the image, the host control unit (host controller 2) may be configured to set a value of a third duty cycle in the transition interval at a value different from both a value of a first duty cycle in the first period and a value of a second duty cycle in the second period to cause the display control unit (the timing generator 3) to reduce the luminance difference of the image data.

With this configuration, since the third duty cycle is set for the transition interval, it is possible to reduce a change in luminance when the frame rate is changed, in comparison to the case in which the transition interval is unset.

As for the display control device (1) according to Aspect 3 of the present disclosure, with respect to Aspect 1 or 2, when a gamma value is an index of brightness of the image data, the host control unit (host controller 2) may be configured to set a third gamma value in the transition interval at a value different from both a first gamma value in the first period and a second gamma value in the second period to cause the display control unit (timing generator 3) to reduce the luminance difference of the image data.

With this configuration, since the third gamma value is set for the transition interval, it is possible to reduce a change in luminance when the frame rate is changed, in comparison to the case in which the transition interval is unset.

As for the display control device (1) according to Aspect 4 of the present disclosure, with respect to any of Aspects 1 to 3, the host control unit (host controller 2) may be configured to set a value of a third frame rate in the transition interval at a value between a value of the first frame rate and a value of the second frame rate to cause the display control unit (timing generator 3) to reduce the luminance difference of the image data.

With this configuration, since the third frame rate is set for the transition interval, it is possible to reduce a change in luminance when the frame rate is changed, in comparison to the case in which the transition interval is unset.

The display apparatus (10) according to Aspect 5 of the present disclosure may include the display control device (1) according to any of Aspects 1 to 4. With this configuration, it is possible to implement the display apparatus capable of achieving the same effects as those of the display control device according to Aspect 1 of the present disclosure.

A method according to Aspect 6 of the present disclosure is used to control the display control device (1) configured to control the display apparatus (10) including the display panel (4). The display control device includes the host control unit (host controller 2) configured to obtain or generate image data of an image to be displayed on the display panel and the display control unit (timing generator 3) configured to output to the display panel the image data transferred from the host control unit. The method includes causing the host control unit to set a transition interval between a first period for which the image is displayed at a first frame rate and a second period for which the image is displayed at a second frame rate different from the first frame rate, the transition interval being a period in which a frame rate is changed between the first frame rate and the second frame rate. The method further includes causing the display control unit to reduce a luminance difference of the image data in the transition interval, the luminance difference being caused when the frame rate is changed between the first frame rate and the second frame rate. With this configuration, it is possible to implement the control method capable of achieving the same effects as those of the display control device according to Aspect 1 of the present disclosure.

The display control device according to the aspects of the present disclosure can be implemented as a computer. In this case, a program for implementing the display control device as a computer by causing the computer to operate as the units (software elements) included in the display control device and a computer-readable recording medium storing such a program are also embodied in the scope of an aspect of the present disclosure.

APPENDIX

The present disclosure contains subject matter related to that disclosed in Japanese Priority Patent Application JP 2019-225920 filed in the Japan Patent Office on Dec. 13, 2019, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

The present disclosure is not limited to the embodiments described above and various changes can be made within the scope described in the claims. Embodiments constituted by any combination of technical means disclosed in the different embodiments are embodied in the scope of the present disclosure. Furthermore, by combining technical means disclosed in the embodiments with each other, a novel technical feature may be formed.

While there have been described what are at present considered to be certain embodiments of the invention, it will be understood that various modifications may be made thereto, and it is intended that the appended claims cover all such modifications as fall within the true spirit and scope of the invention.

What is claimed is:

1. A display control device, for controlling a display apparatus including a display panel, comprising:

a host control unit configured to obtain or generate image data of an image to be displayed on the display panel; and a display control unit configured to output, to the display panel, the image data transferred from the host control unit, wherein:

the host control unit is further configured to set a transition interval between a first period for which the image is displayed at a first frame rate and a second period for which the image is displayed at a second frame rate different from the first frame rate, the image being displayed at the second frame rate in the transition interval, and cause the display control unit to reduce a luminance difference of the image data in the transition interval, the luminance difference being caused when a frame rate is changed between the first frame rate and the second frame rate; and when a duty cycle is a ratio of a pixel light emission time of the display panel to a display time of the image, the host control unit is further configured to set a value of a third duty cycle in the transition interval at a value different from both a value of a first duty cycle in the first period and a value of a second duty cycle in the second period to cause the display control unit to reduce the luminance difference of the image data.

2. A display apparatus comprising the display control device according to claim 1.

3. A computer-readable non-transitory recording medium storing a control program that causes a computer to function as the display control device according to claim 1, the control program comprising:

causing a computer to function as the host control unit and the display control unit.

4. A display control device, for controlling a display apparatus including a display panel, comprising:

a host control unit configured to obtain or generate image data of an image to be displayed on the display panel; and a display control unit configured to output, to the display panel, the image data transferred from the host control unit, wherein:

the host control unit is further configured to set a transition interval between a first period for which the image is displayed at a first frame rate and a second period for which the image is displayed at a second frame rate different from the first frame rate, the image being displayed at the second frame rate in the transition interval, and cause the display control unit to reduce a luminance difference of the image data in the transition interval, the luminance difference being caused when a frame rate is changed between the first frame rate and the second frame rate; and when a gamma value is an index of brightness of the image data, the host control unit is further configured to set a third gamma value in the transition interval at a value different from both a first gamma value in the first period and a second gamma value in the second period to cause the display control unit to reduce the luminance difference of the image data.

5. A display apparatus comprising the display control device according to claim 4.

6. A computer-readable non-transitory recording medium storing a control program that causes a computer to function as the display control device according to claim 4, the control program comprising:

causing a computer to function as the host control unit and the display control unit.

7. A method for controlling a display control device configured to control a display apparatus including a display panel, the display control device including a host control unit configured to obtain or generate image data of an image to be displayed on the display panel and a display control unit configured to output, to the display panel, the image data transferred from the host control unit, the method comprising:

causing the host control unit to set a transition interval between a first period for which the image is displayed at a first frame rate and a second period for which the image is displayed at a second frame rate different from the first frame rate, the image being displayed at the second frame rate in the transition interval; and causing the display control unit to reduce a luminance difference of the image data in the transition interval, the luminance difference being caused when a frame rate is changed between the first frame rate and the second frame rate, wherein when a duty cycle is a ratio of a pixel light emission time of the display panel to a display time of the image, the host control unit is further configured to set a value of a third duty cycle in the transition interval at a value different from both a value of a first duty cycle in the first period and a value of a second duty cycle in the second period to cause the display control unit to reduce the luminance difference of the image data.

8. A method for controlling a display control device configured to control a display apparatus including a display panel, the display control device including a host control unit configured to obtain or generate image data of an image to be displayed on the display panel and a display control unit configured to output, to the display panel, the image data transferred from the host control unit, the method comprising:

causing the host control unit to set a transition interval between a first period for which the image is displayed at a first frame rate and a second period for which the image is displayed at a second frame rate different from the first frame rate, the image being displayed at the second frame rate in the transition interval; and causing the display control unit to reduce a luminance difference of the image data in the transition interval, the luminance difference being caused when a frame rate is changed between the first frame rate and the second frame rate, wherein when a gamma value is an index of brightness of the image data, the host control unit is further configured to set a third gamma value in the transition interval at a value different from both a first gamma value in the first period and a second gamma value in the second period to cause the display control unit to reduce the luminance difference of the image data.

* * * * *